United States Patent [19]
Carlini et al.

[11] Patent Number: 5,576,496
[45] Date of Patent: Nov. 19, 1996

[54] METHOD AND MEANS FOR TESTING CV DRIVEAXLES

[75] Inventors: Sean M. Carlini, Rockford; Lynn R. Smith, Machesney Park, both of Ill.; Arthur J. Zangerle, Muskego, Wis.; Douglas Vandenberg, St. Charles, Ill.

[73] Assignee: Rockford Acromatic Products Co., Rockford, Ill.

[21] Appl. No.: 540,547

[22] Filed: Oct. 6, 1995

[51] Int. Cl.$^6$ ...................................................... G01M 1/16
[52] U.S. Cl. .................. 73/460; 73/121; 73/660
[58] Field of Search .............................. 73/66, 460, 462, 73/465, 121, 122, 123, 124, 125, 126, 127, 129, 130, 131, 132, 660, 658, 865.9

[56] References Cited

U.S. PATENT DOCUMENTS

| | | | |
|---|---|---|---|
| 4,724,708 | 2/1988 | Okano | 73/460 |
| 5,081,873 | 1/1992 | Kikuchi | 73/865.9 |
| 5,428,979 | 7/1995 | Knipp | 73/460 |

*Primary Examiner*—Christine K. Oda
*Attorney, Agent, or Firm*—Leydig, Voit & Mayer Ltd.

[57] ABSTRACT

A test unit is provided for operatively testing CV driveaxles. The test unit has a drive spindle connected to a motor, and a pivotable brake spindle connected to a brake. An axle under test is connected with spindle adaptors to the drive and brake spindles. During a test, the axle under test is rotated by the motor, the brake is engaged to load the axle, and the brake spindle is pivoted to flex at least the outboard CV joints. The test unit is easily adaptable for testing different axles by using spindle adaptors. An accelerometer on the bearing block of the brake spindle detects vibration generated by the axle under test.

20 Claims, 6 Drawing Sheets

METHOD AND MEANS FOR TESTING CV DRIVEAXLES

FIELD OF THE INVENTION

This invention relates to testing of CV driveaxles, and more particularly to a test unit capable of testing driveaxles having constant velocity joints.

BACKGROUND OF THE INVENTION

Constant velocity joints are a special class of universal joint in which the angular velocity of the output and input shafts match identically, irrespective of the angle of the joint. Due to this characteristic of uniform velocity transfer, CV joints find significant application in front wheel drive automobiles, and are usually applied two per drive axle and thus four per vehicle.

A CV joint generally comprises an inner race, an outer race, a ball cage and coupling balls. Both the inner and outer races have ball tracks for accepting the coupling balls which transfer torque from one race to the other. When the axle is rotated with the CV joint flexed to accommodate a given angle between input and output shafts, the coupling balls travel back and forth in the ball tracks.

Because CV joints on drive axles are used to transfer torque from the engine to the driving wheels, they are often operated under high stress. The joints are lubricated in manufacture, and a flexible boot installed to seal the joint from dust and moisture. The boots can crack or tear, which will allow the entry of moisture or dirt, the deterioration of the lubricant, and the accelerated wear of the joint or its components. Even in cases where the boot is not damaged, the joint can wear over time. Often the wear exhibits itself as shallow grooves formed in the tracks.

A defective joint will usually be manifest by a rhythmic clicking sound when the joint is flexed and under load, or in more extreme cases by significant vibration. The clicking is especially predominant when the vehicle is under load, such as when accelerating around a turn. Indeed, oftentimes a defective joint will not exhibit the telltale clicking, even with the joint flexed, if the joint is not operated under significant load.

The difficulty in isolating driveaxle problems from other types of noise and vibration will be apparent. Since the clicking and sometimes the vibration are only exhibited under load while in a turn, and since there are numerous other components of the automobile which can click and vibrate under the same conditions, it takes a degree of skill and experience to pinpoint a problem as a defective driveaxle.

Even though the technology for manufacture and lubrication of constant velocity joints has provided joints with relatively long life, it is not uncommon for the driveaxle to fail long before the remainder of the vehicle has deteriorated to an extent which would render it unserviceable. Thus, there is a significant market for replacement driveaxles. Due to the significant cost of some of the driveaxle components, and the fact that only a limited number of the components are likely to fail, an industry has grown up around rebuilding driveaxles. Some rebuilding shops use relatively sophisticated equipment such as the constant velocity joint tester described and claimed in commonly owned Philpott et al U.S. application Ser. No. 08/468,138, filed Jun. 6, 1995, allowed (Attorney Docket 62877). Others rely on visual inspection. But in any event, ultimately judgments are made as to which parts should be replaced, which can be repaired or re-machined and which can be reused without repair. In the end, the CV joint is re-assembled, hopefully with non-defective parts, and two joints are assembled to an axle to provide a rebuilt driveaxle. It would be useful to test such an axle before selling it or installing it in an automobile. However, due to the characteristics of the driveaxle, particularly the intermittent manner in which they exhibit faults, such a test has not been readily available.

In the CV joint rebuilding industry where many CV joints are rebuilt daily, any axle testing device must be simple to use and reasonably foolproof. Because many different kinds of driveaxles of different sizes and shaft configurations are used on vehicles by different manufacturers, it is necessary that the embodiment of the testing apparatus be rapidly adapted for testing different axles.

Even in the setting of a regular automobile repair shop not specialized in rebuilding CV joints, a reliable and inexpensive axle testing apparatus is valuable for diagnostic purposes. When the drive train of an automobile develops vibration and noise, the cause could lie in any part of the drive train. With a convenient driveaxle testing system, a mechanic can find out quickly whether the axle is the cause of the drive train problem. Thus an axle testing system will be useful for locating drive train problems and for avoiding the undesirable mistake of replacing a good axle without fixing the problem.

SUMMARY OF THE INVENTION

In view of the foregoing, it is a general object of the present invention to provide a testing system for reliably determining whether a driveaxle with CV joints will function properly under the normal operational conditions usually encountered in an automobile.

To that end, it is a related object to provide a testing system which simulates the operational conditions which the axle would experience if it were mounted on an automobile.

It is a further object that the testing system be easily adapted for testing drive axles of different shaft configurations.

It is an object that the testing system be simple to build and relatively inexpensive so that it is affordable to regular automobile repair shops.

It is another object that the testing system be simple to operate so that it does not take much training or experience to operate it. A related object is that it be easy for the operator of the testing system to control the testing conditions imposed on the axle under test. It is another related object that the testing system provide a qualitative check on axle condition, and, if desired, a quantitative test result.

It is a feature of the present invention that a drive axle is tested by rotating it while controllably altering the flex angle of at least one CV joint while subjecting the axle to a loading torque which simulates its operation on a vehicle. A further feature is the ready adaptation of the test apparatus to driveaxles of many different types by the use of quick change drive and brake side adaptors.

In accordance with the above listed and other objects of the invention, there is provided a test unit having a drive assembly and a brake assembly mounted on a support frame. The drive assembly has a drive spindle connected to a motor. The brake assembly has a brake spindle connected to a brake. A plurality of spindle adaptors are provided for matching a plurality of driveaxle types. A pair of spindle adaptors which match the driveaxle under test are installed in the drive and brake spindle respectively. Quick-change fixtures including a keyway capable of transmitting test torque, and a quick-release detent for assuring the adaptor is locked in position, allow the rapid installation and interchange of the adaptors. The axle to be tested is installed with the splined ends of the driveaxle fitting into the respective spindle adaptors. The motor rotates the drive spindle to rotate the axle. A preset loading torque is controllably applied to the axle by engaging the brake. At the same time, the brake spindle is controllably pivoted to vary the flex angle of the CV joint, while the unit is monitored for unusual "clicking" sounds or other vibrations.

Other objects and advantages will become apparent from the following detailed description when taken in conjunction with the drawings, in which:

DETAILED DESCRIPTION OF THE PREFERRED EMBODIMENTS

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Figure 1:
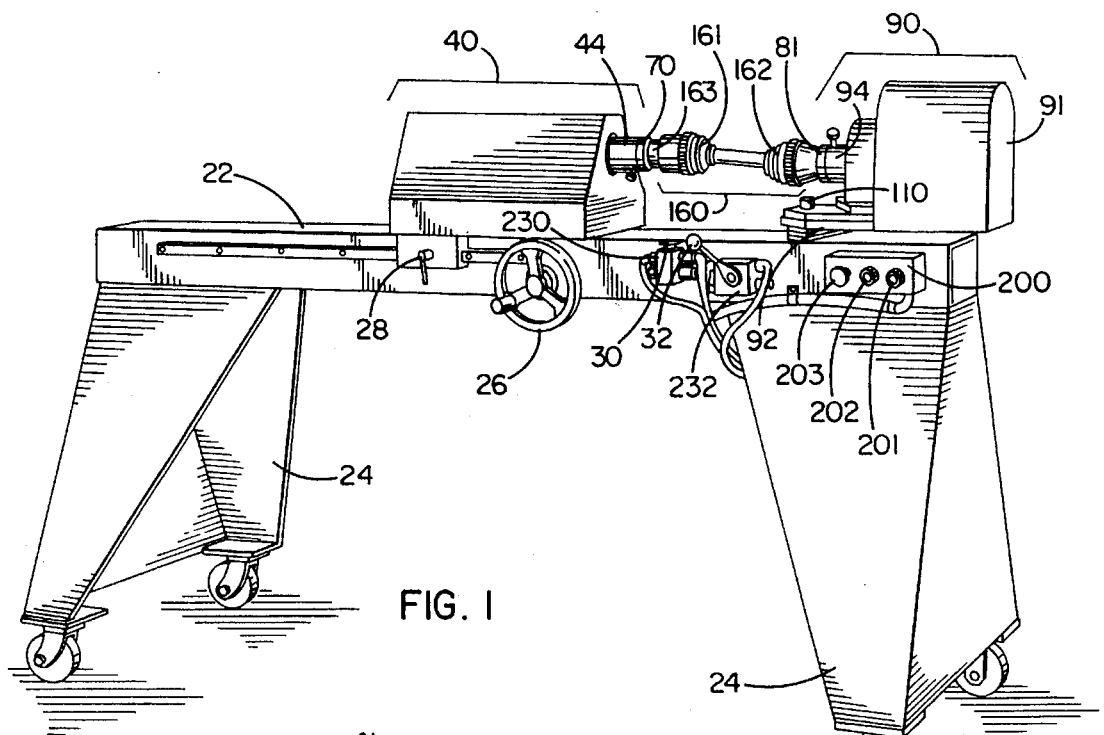
FIG. 1 is a perspective view illustrating a test unit according to the present invention for testing CV driveaxles.

Turning now to the drawings, FIG. 1 is a perspective view of the preferred embodiment of a test unit according to the present invention. A base 22, preferably in the form of a length of steel channel of rectangular cross-section, serves as the support on which other components of the unit are mounted. The base 22 is supported by legs 24 and, if desired by wheels or rollers 23.

For purposes of driving a driveaxle for test, the base carries a drive assembly 40 adapted to drivingly engage a first end 163 of a driveaxle 160. Cooperating with the drive assembly is a brake assembly 90, also carried on the base 22, and adapted to support a second end 164 (FIG. 7) of the driveaxle 160. As will be described in greater detail below, the drive assembly 40 carries a motor which rotates the axle, while the brake assembly 90 carries a brake assembly to load the rotating axle, and has associated therewith a pivot assembly to flex at least one of the joints of the driveaxle for a qualitative test of operability. In that condition, vibration which is generated at any particular angle can be readily detected. Most simply, the vibration is detected by observation, and by detecting the characteristic clicking sound by ear. In a more completely instrumented system, an accelerometer and electronic control circuitry provide a quantitative indication of the axle vibration.

In greater detail, the right end of the base 22 supports the brake assembly 90. The brake assembly 90 includes a base plate 92, which is mounted for controllably pivoting about a pivot 110 on the base 22. The brake assembly has a brake spindle 94 to which a shaft of the axle under test can be connected. The brake spindle 94 is connected to a hydraulic brake caliper 128b associated with a brake disc 128a (shown in FIG. 7) in the brake assembly 90. To the left of the brake assembly 90 is a drive assembly 40 which is also carried by the base 22. The drive assembly 40 is mounted for manually driving translation along the base 22. In the illustrated embodiment, translation of the drive assembly is controlled manually by means of a handwheel 26. Alternatively, a motor drive operated, for example, by a foot switch can be utilized. A manually operated lock, such as half-turn lock 28, is provided for locking the drive assembly in a desired position.

Figure 2:
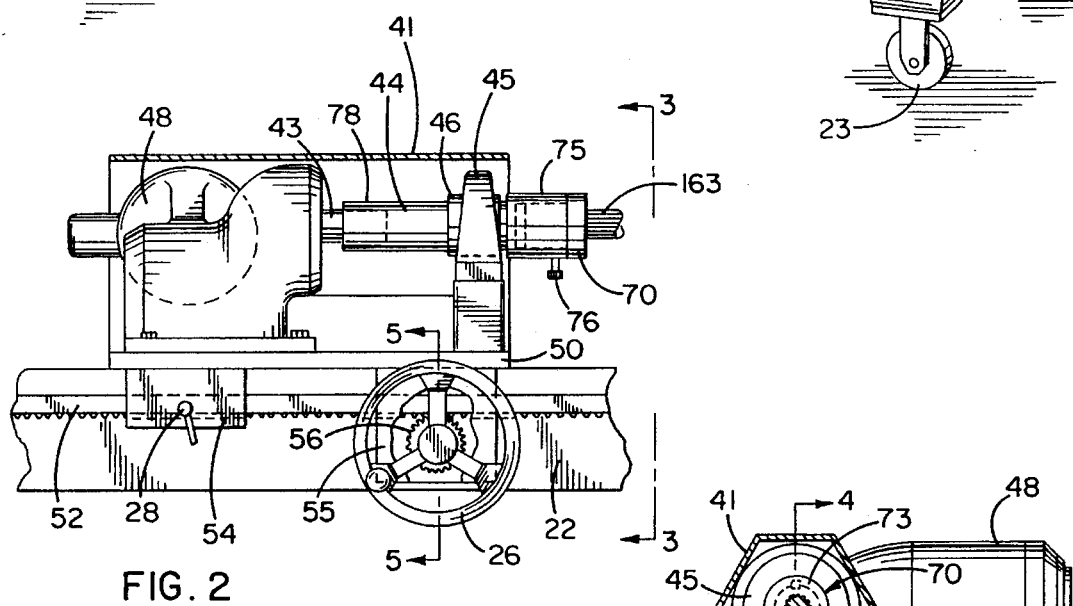
FIG. 2 is a front elevation showing the drive assembly of the test unit with the cover cut away to reveal the drive components.
Figure 3:
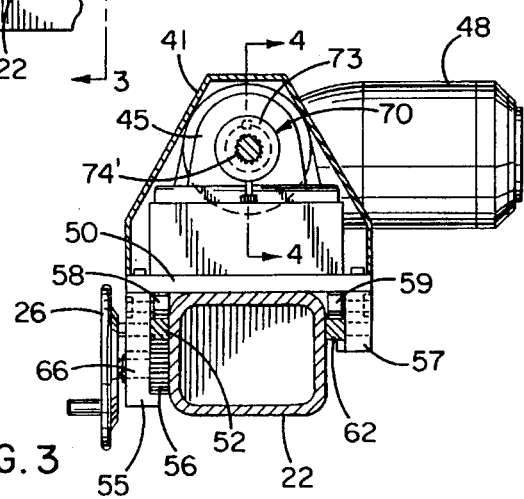
FIG. 3 is an end elevation of the drive assembly taken along the line 3—3 of FIG. 2.

Referring to FIG. 2, it will be seen that the drive assembly 40 is mounted on a base plate 50. An electrical motor 48 is mounted on the plate 50 with an output shaft 43 parallel to the axis of the base 22. The motor 48 is preferably an AC gearmotor having a relatively low speed output shaft (such as 50 rpm.), and of sufficient capacity, such as 2 horsepower, to significantly load the driveaxle, by applying on the order of 200 ft. lbs. of torque to the axle under test. A drive spindle 44 is mounted on the motor shaft 43 and is held horizontal by a bearing 46 in a pillow block 45 mounted on the base plate 50. The axis of the drive spindle 44 is parallel to the axis of the base 22.

In accordance with an important aspect of the invention, the drive spindle 44 is configured to be compatible with a plurality of drive adaptors, one of which is shown at 70, and to be attachable to the spindle by a quick-change fixture. As will be described in greater detail below, one of the drive adaptors 70 is installed in the drive spindle 44 by simply releasing a detent mechanism 76, one element of the quick-change fixture, and sliding the adaptor 70 into place until the detent returns to its locked position. A key, fixed in the drive spindle, and mating a keyway in the adaptor 70 provides a secure quickly made driving connection between the drive spindle 44 and the adaptor 70 so as to reliably load the drive axle under test during the course of the test. The manner in which the adaptor and spindle are interfit and adapted for quick change, will now be described.

Figure 4:
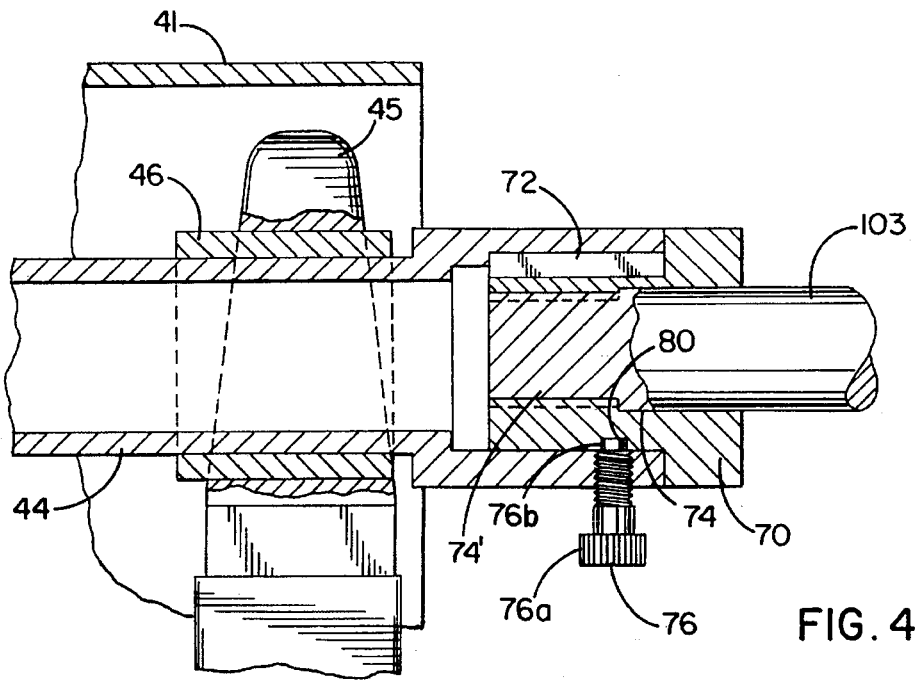
FIG. 4 is a cross-sectional view taken along the line 4—4 of FIG. 3, showing a spindle adaptor in the drive spindle and engaged with the splined shaft of an axle under test.
Figure 6:
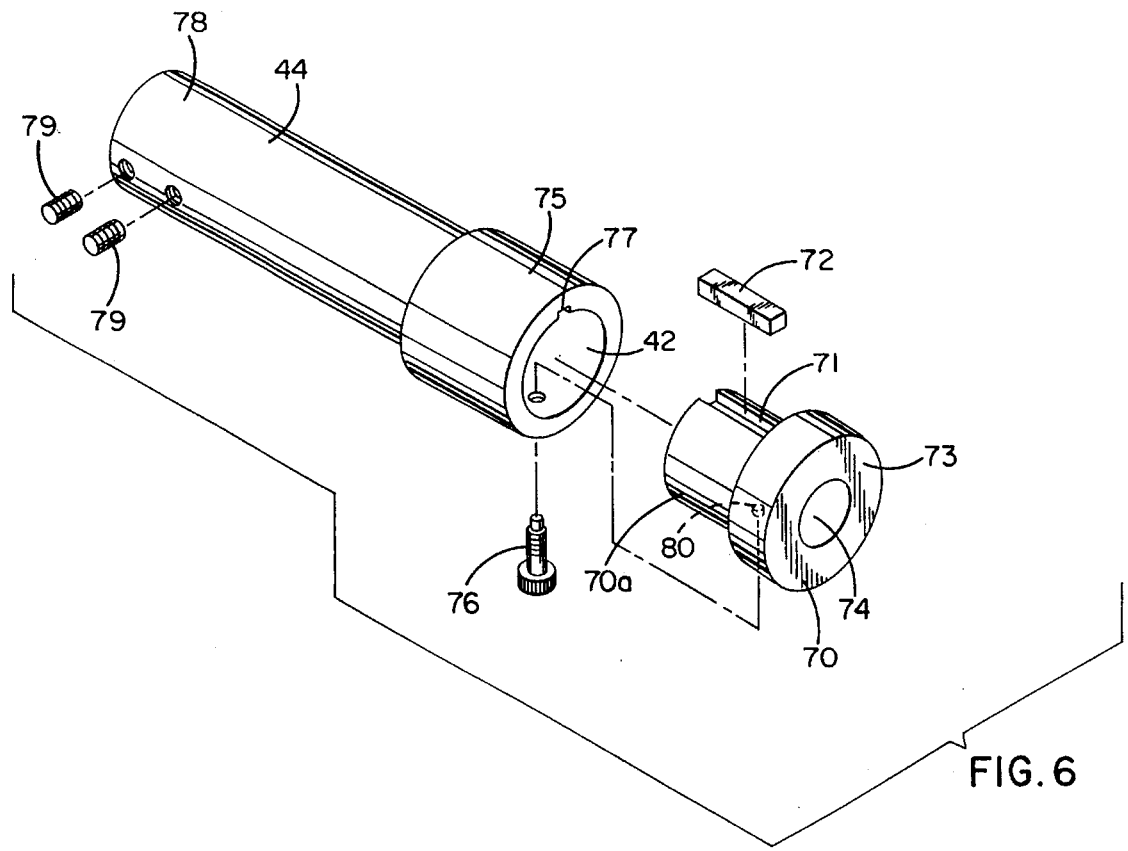
FIG. 6 is an exploded perspective view of the drive spindle and a spindle adaptor.

In accordance with a significant aspect of the invention, the driveaxle testing unit is rendered suitable for practical use in the rebuilding industry by virtue of its ready adaptability to the wide variety of driveaxles which are typically rebuilt. A significant feature of the adaptability is the provision for spindle adaptors which interface between the drive and brake components on the test unit and the variety of driveaxles which are rebuilt. FIG. 4 shows one such spindle adaptor attached to the drive spindle 44. FIG. 6 shows the elements of the drive spindle and adaptor in exploded perspective view. Referring concurrently to those figures, it will be seen that the spindle 44, which is securely attached to the motor output shaft, as by set screw 79, and carries at its opposite end a hub 75 configured to fit a spindle adaptor 70. The hub 75 has an internal bore 42 of a size compatible with the outer diameter of the drive hub portion 70a of the adaptor 70.

For reliably transmitting torque from the drive spindle 44 to the driveaxle, the adaptor 70/spindle 44 interface include a drive key 72. The key is preferably affixed in a keyway 77 in the drive spindle 44. A press fit can be utilized or other means of attachment employed. However, it is desired that the key 72 remain in place in the spindle 44, so as not to complicate insertion of the adaptor 70. The adaptor 70 has a keyway 71 adapted to slidingly receive the key 72. The key 72 is of sufficient size, such as ⅜" key stock to assure that the load is transmitted from spindle to adaptor without damage. It would be technically possible, for example to utilize some form of collet arrangement for quick mounting of the driveaxle or an adaptor, but considering the significant torque which must be utilized in the system, the positive interference of the keyway is much preferred.

For assuring that the adaptor 70 is in the proper position, and for preventing the adaptor from moving from the proper position once seated, detent means 76 in the form of a spring plunger assembly are fixed to the hub 75 of the spindle adaptor 44. As best shown in FIG. 4, the spring plunger 76 includes a knob 76a which can be manually retracted to withdraw a pin plunger 76b from an aperture 80 formed in the spindle adaptor 70. Upon installation, when the spindle adaptor 70 is slid into the bore (after first withdrawing the spring plunger then releasing it, the plunger will seat in the aperture 80, signalling the proper placement of the adaptor.

FIG. 4 illustrates a shaft 103 of a driveaxle inserted within the adaptor 70. The adaptor has a splined connection 74' at its base which is intended to receive the splined end of the shaft 103. It is primarily the spline (as well as the length of the adaptor) which are particularly adapted to the various form of driveaxles. The many forms of splines require many forms of adaptors (such as 30 adaptors) in order to render the testing unit suitable for the wide variety of driveaxles which it is intended to encounter. FIG. 4 illustrates the drive hub, adaptor and shaft 103 of a driveaxle all in appropriate position for a completed test.

Referring briefly to FIG. 1, it will be seen that the spindle of the drive assembly 40 is somewhat higher than the spindle 81 of the brake assembly. In the normal automobile installation, the inboard side joint is normally higher than the outboard side joint, the inboard side joint being attached to the transmission and the outboard side joint to the wheel. Configuring the testing unit with the drive side hub slightly higher than the brake side hub, replicates this condition.

Figure 7:
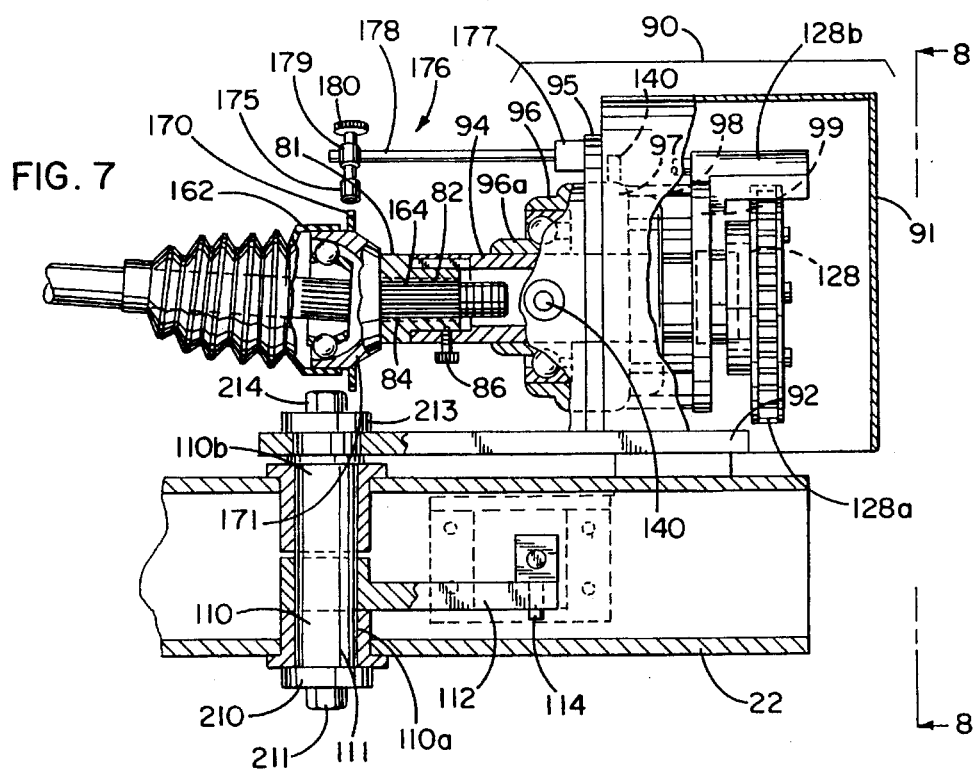
FIG. 7 is a front elevation, partly in cross-section showing the brake assembly.

Referring to FIG. 7, the brake side unit is shown, with an output shaft 164 from the CV joint 162 fitting into brake side adaptor 81 which in turn fits into the brake spindle 94. It will be seen that the brake side adaptor 81 is of somewhat different configuration than the drive side adaptor 70, in that the splines 164 are closer to the hub 81, and an open area is provided behind the splines for receiving the normally threaded portion of the drive side stub shaft. The keyway 82 and detent 86 mechanisms are the same as that illustrated in greater detail for the drive side hub. FIG. 7 also shows the intermediate portion of the axle inclined at a slight upward angle to accommodate the slightly elevated drive side spindle.

The brake assembly is supported on a brake base plate 92 which has an upstanding flange 95 on which are mounted flange-type bearing blocks 96, 97. The bearing 96 is cut away to show an internal race 96a press fit on the brake spindle 94 to support the brake spindle for rotation. For further support of the brake assembly, a spacer arrangement 98 mounts a further bearing plate 99 to support a further bearing and provide additional spaced support for the brake spindle 94.

FIG. 7 schematically illustrates a conventional automobile disc brake 128 associated with the end of the brake spindle 94. The brake assembly 128 includes a disc 128a fixed to the spindle 94 and fixed components including a caliper assembly 128b which is hydraulically actuated to engage the disc and apply a braking force to the brake spindle 94. As will be described in greater detail below, a hydraulic circuit is provided for applying a constant brake force of predetermined magnitude which is intended to load the driveaxle under test at a predetermined torque limit. A cover 91 shields the components and is preferably louvered in order to dissipate heat generated in the braking assembly.

In accordance with a significant aspect of the invention, the brake assembly 90 is controllably pivotable to controllably flex the outboard CV joint 162. Thus, the base plate 92 is supported for rotation about a pivot assembly 110 and is provided with means for controllably manipulating the pivot.

Figure 8:
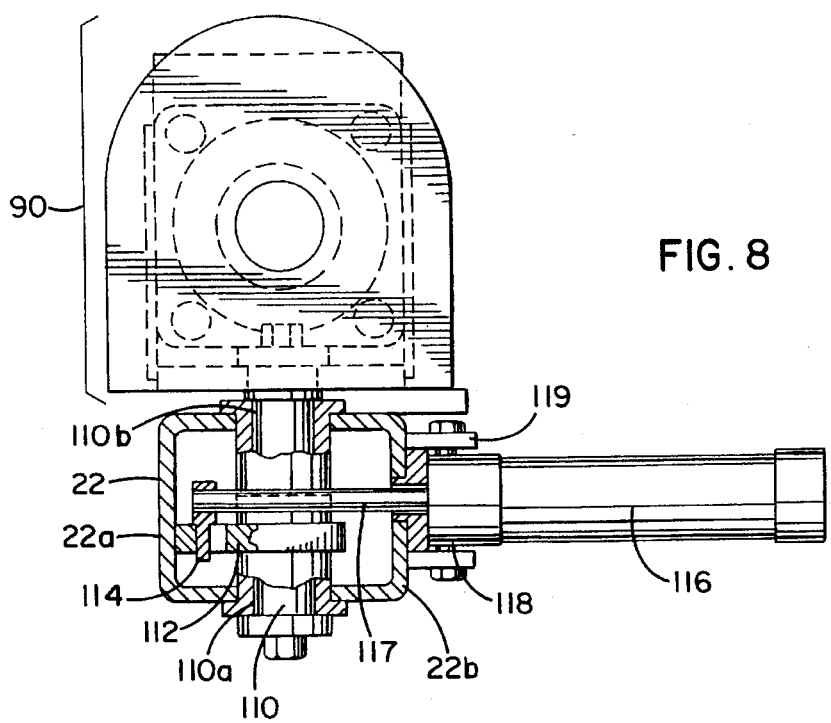
FIG. 8 is an end elevation taken along the line 8—8 of FIG. 7, showing the pivot mechanism for the brake assembly.

The pivot assembly is based on a pivot shaft 110 which is supported in bearings 110a, 110b (see also FIG. 8). A washer 210 and bolt 211 prevent the shaft 110 from being pulled through the bearing 110a. At the top of the pivot shaft, the base plate 92 is mounted for rotation and is secured in place by a pivot plug 213 and a bolt 214. In an intermediate portion on the shaft, there is attached a pivot lever 112 fixed to the shaft for rotating the shaft either fore or aft. Since the base plate 92 is secured to the shaft, rotation of the pivot lever 112 will serve to rotate the base plate.

Figure 9:
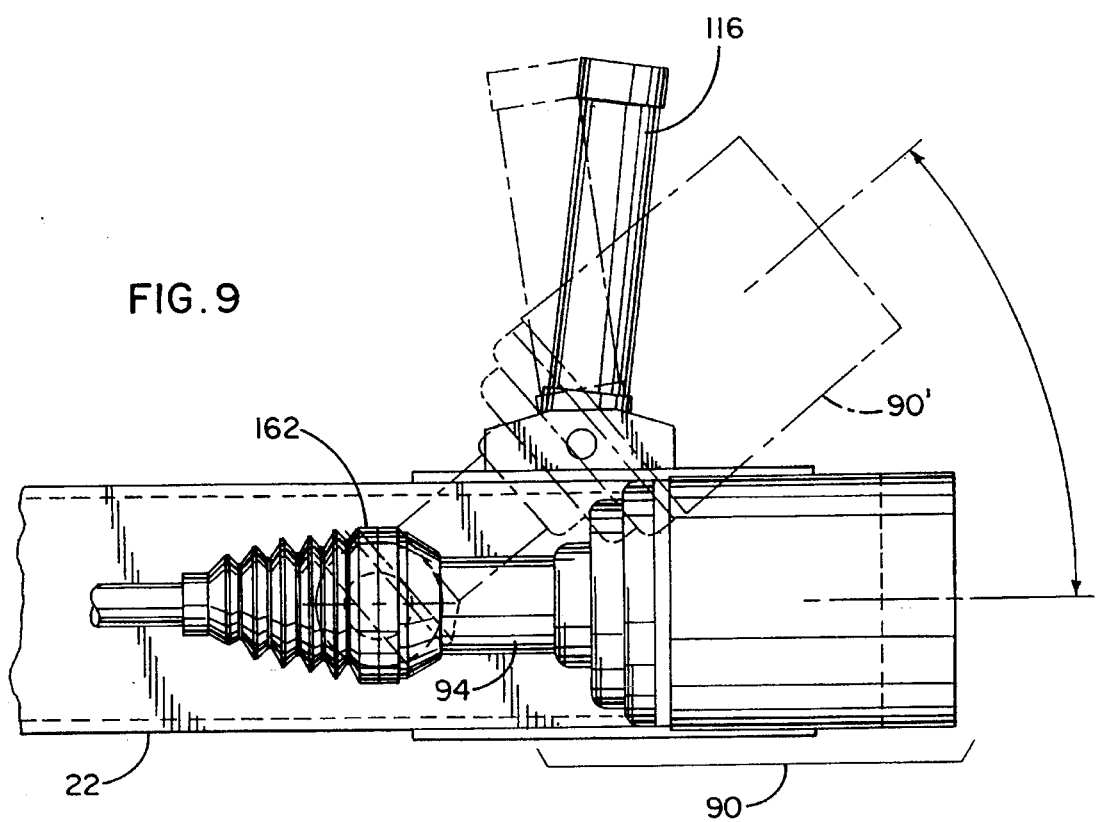
FIG. 9 is a plan view of the brake assembly showing the range of pivoting of the brake assembly.

As best seen in FIG. 8, a hydraulic cylinder 116 is trunnion mounted on a bracket 119 which is fixed to the base 22. A cylinder rod 117 is connected to the free end 114 of the pivot arm 112 (see also FIG. 7). When the cylinder 116 is in its fully extended position, the end 114 of the pivot bracket 112 engages the inside of the channel 22, thus encountering a mechanical stop. The base plate 92 is affixed to the rotating shaft such that the brake assembly is in the neutral position in that position. By the neutral position is meant the position in which the brake spindle axis is parallel to the drive spindle axis. Controllably pressurizing the hydraulic cylinder 116 will cause the retraction of the cylinder rod 117 and the pivoting of the pivot lever 112, causing the brake assembly to rotate about the pivot axis 110. FIG. 9 shows the two extreme positions. The solid line showing of FIG. 9 illustrates the neutral position, whereas the dash line showing illustrates the farthest extreme position in which the brake assembly is pivoted approximately 40° from the neutral position. As will be appreciated from FIG. 9, that causes approximately a 40° flex in the CV joint 162. The cylinder 116 is a hydraulically operated cylinder, and is controlled such that movement between the extreme positions illustrated in FIG. 9 is adequately slow to test the universal joint under all conditions of flex. The hydraulic circuit, as will be described below, is configured to allow the user to control the direction and speed of movement, stopping the pivoting at any point that vibration or audible clicking is detected, so as to allow a complete test of the driveaxle under all desired conditions.

Figure 5:
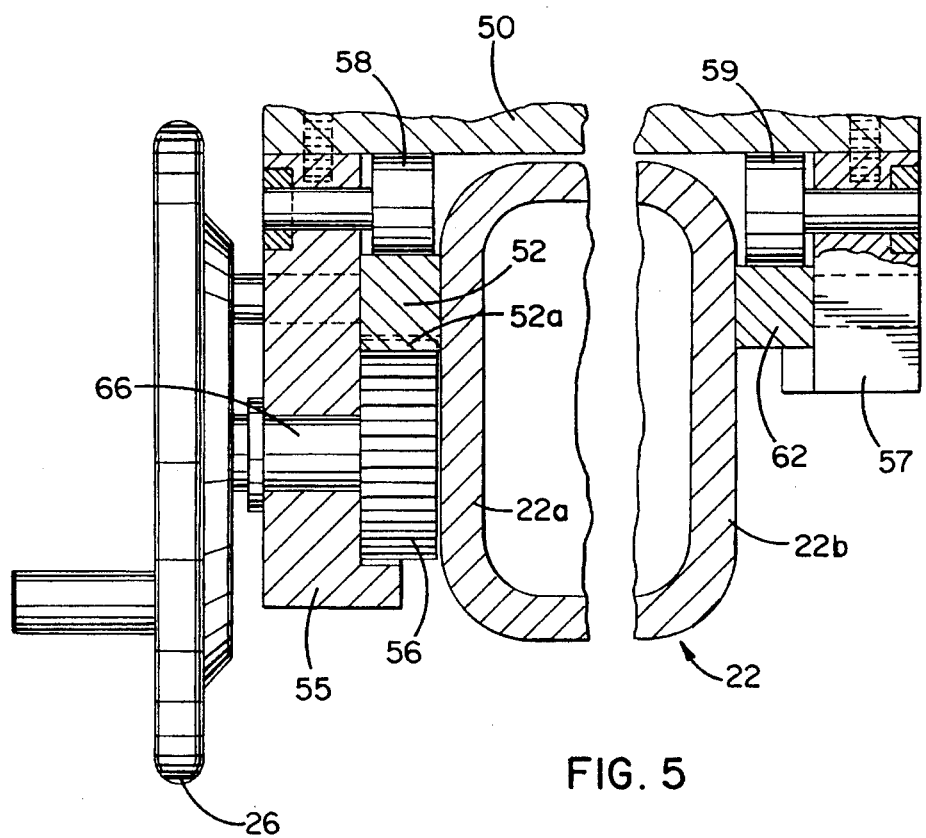
FIG. 5 is a cross-sectional view taken along the line 5—5 of FIG. 2 showing the translation mechanism for translating the drive assembly.

In order to allow a driveaxle to be mounted in the test assembly, and after the appropriate spindle adaptors are installed, means are provided for translating the drive assembly toward or away from the brake assembly. Referring to FIG. 5, it will be seen that the base plate 50 for the drive assembly is supported on rollers 58, 59 which in turn ride on ways 52, 62. The ways, in turn, are affixed to the sides of the base member 22. The base plate 50 is affixed to end members 55, 57 which in turn support the rollers 58, 59 on the ways 52, 62.

FIG. 2 shows that there are two members, one located at each side of the base plate, so that four rollers are provided for causing the drive assembly to smoothly translate along the ways. A gear rack 52a is affixed to the lower side of the way 52 and meshes with a pinion 56 supported in bearings 66 on the end member 55. A shaft attached to the pinion 56 is also connected to a handwheel 26. Thus, rotation of the handwheel 26 causes the rotation of the pinion 56. By virtue of the intermeshing teeth of the pinion 56 with the rack 52a, rotation of the handwheel will cause the drive assembly to translate fore and aft along the ways 52, 62. The end member 54 has associated therewith a locking mechanism 28. As will be appreciated from comparison of FIGS. 2 and 5, the locking mechanism, when rotated, causes the clamping of the end member 54 to its associated way 52, thus restraining the drive assembly from further translation along the ways.

In summary, in order to position the drive mechanism, the lock 28 is released, and the handwheel 55 is rotated either left or right to translate the drive mechanism fore or aft.

Figure 10:
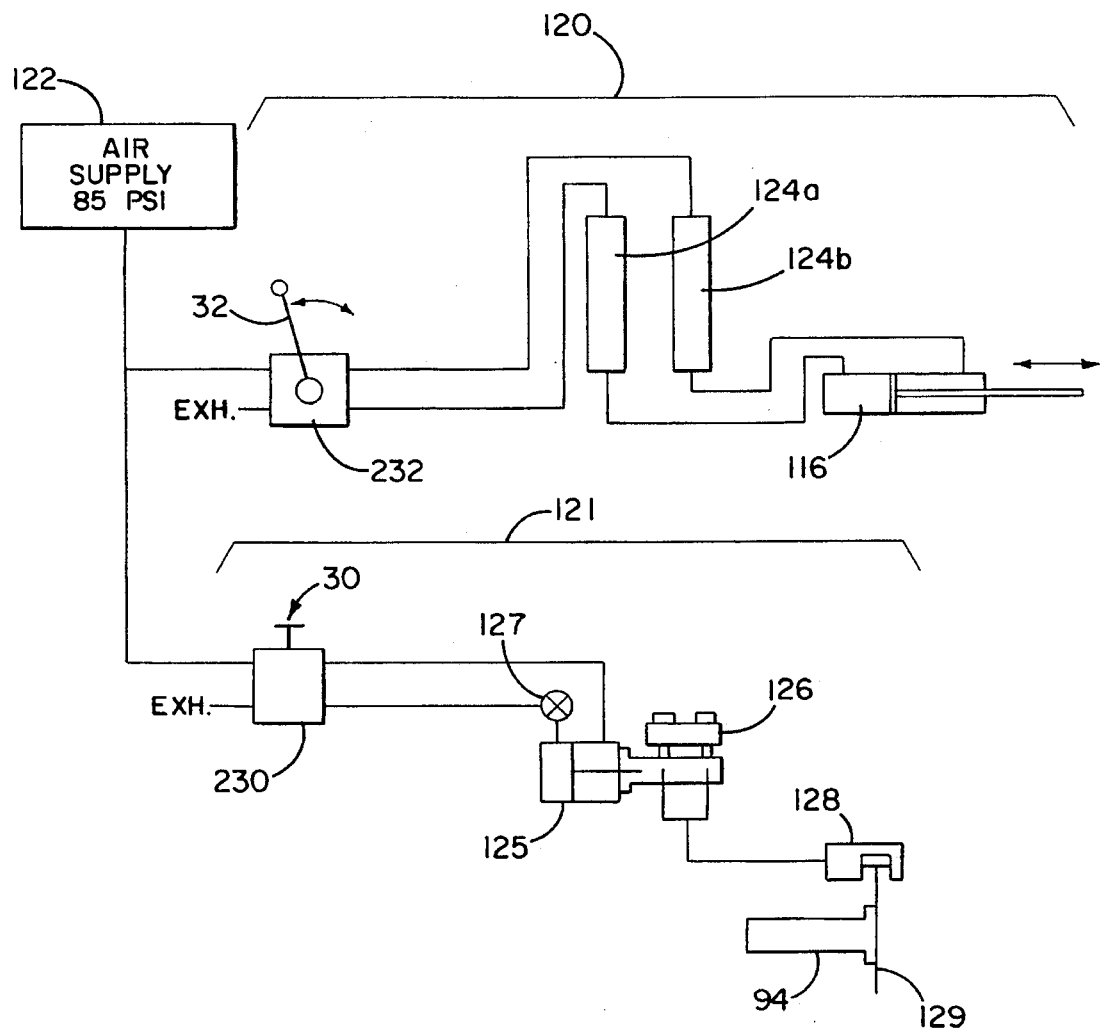
FIG. 10 shows schematically the pneumatic/hydraulic system used in the preferred embodiment of the invention for engaging the brake and pivoting the brake assembly.

Turning now to FIG. 10, there is shown a schematic diagram of the pneumatic/hydraulic components used in the preferred embodiment of the invention. The pneumatic/hydraulic system 120 for brake control and the pneumatic/hydraulic system 121 for pivoting control are pressurized with a common pressurized air supply 122. In one embodiment, an air supply at about 85 psi. is used. A steering control lever 32 mounted on the front of the base 22 (see FIG. 1) operates a four-way pneumatic valve 232 which is linked to the double-acting hydraulic cylinder 116 for pivoting the brake assembly 90 (FIG. 7). The air-over-oil tanks 124a and 124b between the valve 232 and the hydraulic cylinder 116 convert the pneumatic pressure to hydraulic pressure to provide for relatively slow controllable pivoting. Rotating the steering lever 32 clockwise causes the push rod 117 to be withdrawn into the cylinder 116, thereby pivoting the brake assembly 90 (see FIG. 8). An operator accessible brake pushbutton 30 controls a four-way pneumatic valve 230 connected to a double-acting cylinder 125. The operating rod of the cylinder 125 operates a conventional brake master cylinder 126 linked to the brake caliper 128b. A pressure regulator 127 is connected between the double-acting cylinder 125 and the four-way valve 230. The regulator is adjusted to set the brake pressure on the rotor 128a. In a preferred embodiment, the brake pressure is set to generate a braking force in the range between about 150 and 250 ft-lb of torque. Most preferably, for a broad range of automobile CV joints, 200 ft-lb of torque is utilized in the testing apparatus. The brake pushbutton 30 is biased to the off position, such that the button must be held down in order to maintain the braking force. This feature is used to avoid unnecessary operation of the brake which will cause a significant amount of heat to be generated and may damage the brake assembly.

The operation of the test stand will now be described in detail in conjunction with FIGS. 1 and 6. Turning first to FIG. 6, before an axle to be tested is mounted on the stand, the operator first selects adaptors with splined apertures that match the splined shafts of the axle under test. The operator then installs one of the selected adaptors on the drive spindle 44 by sliding the adaptor 70 over the key 72 and into the aperture 42 of the drive spindle. When the plunger 76 returns to the home position, the adaptor is locked in place. Another adaptor is installed on the brake spindle 94 in the same way (see FIG. 7). Referring now to FIG. 1, using the handwheel 26, the operator moves the drive assembly 40 to the left to provide enough space between the drive spindle 44 and the brake spindle 94 for installing the axle. The outboard side splined shaft of the axle 160 is first inserted into the adaptor 81 on the brake spindle 94 (see also FIG. 7). Holding in one hand the CV joint 161 on the inboard side splined shaft 163, the operator rotates the handwheel to advance the drive spindle 44 toward the brake spindle 94. The shaft 163 is inserted into the adaptor 70 on the drive spindle 44 as the drive assembly translates toward the test position. After the shaft 163 is properly seated, the operator can back the drive assembly by a fractional turn, then lock the position of the drive assembly 40 in place with the lock 28.

To energize the drive motor 48 (shown in FIG. 2) to rotate the axle 160, the operator will depress either the "forward" button 201 on the control box 200 or the "reverse" button 202 to drive the axle in the forward or reverse direction respectively. The motor 48 can be stopped by pushing the "stop" button 203. To test the axle under load, the operator pushes the brake pushbutton 30 down with one hand to engage the brake 98, and uses the other hand to control the steering lever 32 to pivot the brake assembly to flex the CV joint 162. By using the steering lever 32, the operator can adjust continuously the pivoting angle within a preset range, which in the preferred embodiment is between 0 degrees and 40 degrees.

Once the axle is loaded into the test unit as described above, it is a relatively simple matter for the operator to energize the motor, engage the brake and flex the CV joint from one side to the other. In the simplest implementation of the invention, the operator simply observes the axle to see if any unusual vibration occurs, and simultaneously listens for a telltale clicking sound which signifies a defective axle.

It will be appreciated that the only joint which is flexed through its operation is the outboard side joint. But that is consistent with the manner of operation of a driveaxle on an automobile. The inboard joint maintains a substantially constant angle during the course of the test. The inboard joint is typically a plunge joint and provides for a degree of thrusting motion of the axle, so that if the axle is not lined up with great precision with the outboard CV joint over the pivot point, the thrusting which is accommodated by the inboard joint will allow self-alignment. The outboard joint is typically a Repazza joint, and it is the joint which is in the position to be most prone to failure. That is the joint which is flexed by the test unit, and it is also the joint which is flexed by turning of the steering wheels in the automobile.

Figure 11:
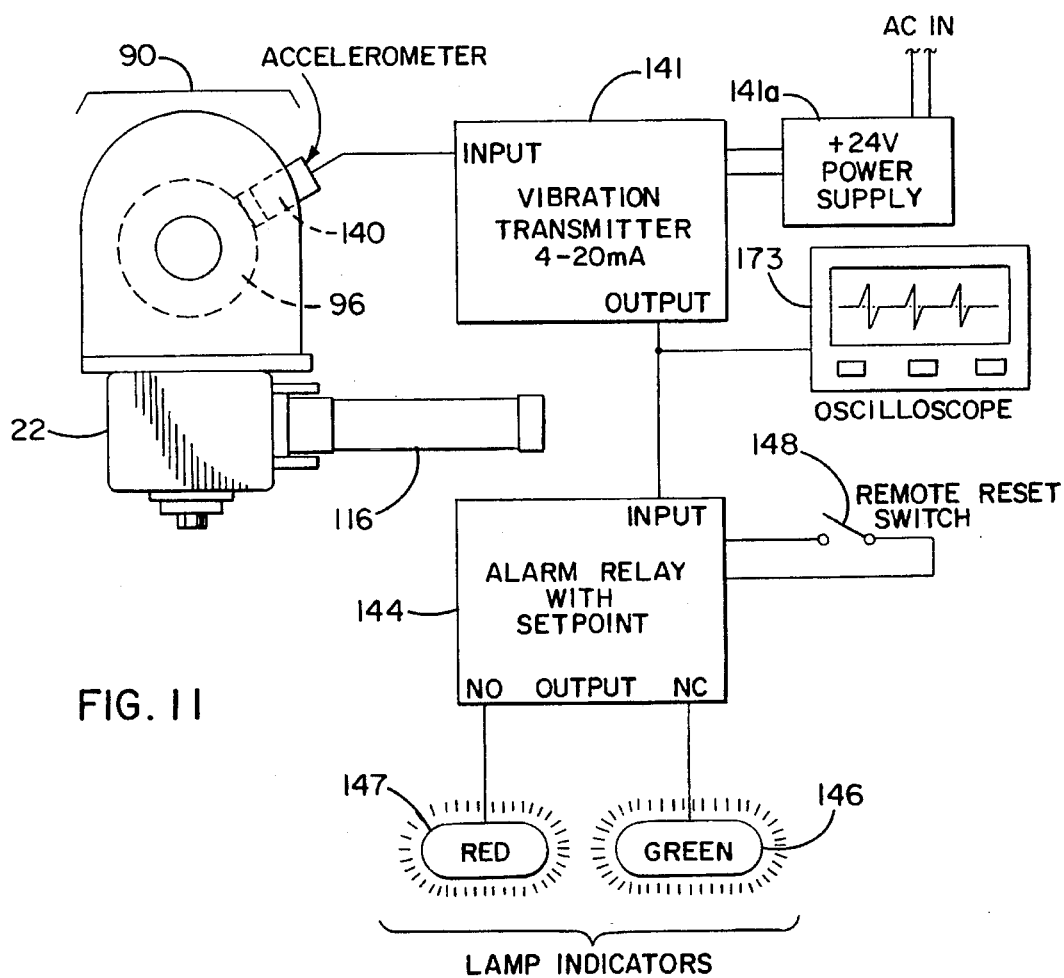
FIG. 11 shows schematically the electrical detection system for detecting vibration generated in an axle under test.

In some situations, it will be desirable to obtain an electrical signal or a go/no go signal indicating the presence of objectionable vibration. In those case, an electrical vibration detection and quantifying system can be provided as illustrated in FIG. 11. In order to sense the vibration at a point close to the source of vibration, in the preferred embodiment an accelerometer 140 is attached to the flange bearing block 96 (see also FIG. 7). Fixing the accelerometer 140 to the bearing block 96 which supports the brake spindle 94 which connects directly to the CV joint is most likely to detect accurately the vibration generated in the CV joint. The electrical detecting apparatus includes an accelerometer 140, a vibration transmitter 141 and a power supply 141*a*. Typically the power supply 141*a* will be a component of the vibration transmitter 141, and the electrical elements of those two subsystems will be mounted in the same miniaturized industrial grade enclosure.

An electrical signal is produced by the accelerometer 140 and coupled to the vibration transmitter 141, which amplifies the signal and converts it into a current signal corresponding to the vibrational amplitude detected. The electrical signal at the output of the vibration transmitter 141 represents the magnitude of the acceleration. In one embodiment of the invention, the electrical signal can be measured using an oscilloscope 173. The peaks of the acceleration can be detected on the oscilloscope trace. Alternatively, a go/no go electrical system can be utilized including an alarm relay circuit 144 with a preset set point. When the current signal is below the set point, the alarm relay remains open, and a green lamp indicator 146 is illuminated. Once the current signal exceeds the set point indicating vibration above a preset level, the alarm relay will be actuated causing a red indicator 147 to be illuminated and extinguishing the green indicator 146. A remote reset switch 148 is provided to reset the alarm relay. The set point of the relay is adjusted to correspond to a chosen threshold vibration level. Any CV joint generating vibration greater than the threshold level will be deemed unacceptable. Thus the electrical vibration detection system provides an extremely simple way for the operator to identify bad CV joints on an axle.

For an even more complete test of the CV joint, means are optionally provided for testing the anti-lock ring which is often associated with the hub of the outboard CV joints. The anti-lock ring is typically a toothed wheel or gear which is associated with a sensor in the automobile. The sensor senses the passage of the gear teeth, and uses that as a measure of wheel speed. The anti-lock brake system compares the speed of the automobile wheels to control hydraulic braking. If the gear is bent or teeth are broken off, the anti-lock braking system will not function correctly.

In practicing this subsidiary aspect of the invention, means are associated with the drive axle test stand for testing the integrity of the anti-lock brake gear. Turning to FIG. 7, there is shown an anti-lock ring 170 which is press fit onto the hub 171 of the CV joint 162. As better shown in FIG. 12, the anti-lock ring 170 has a plurality of teeth, which are normally counted by a sensor in the anti-lock brake system. A gear tooth sensor, in the preferred embodiment, a hall effect sensor 175 is disposed adjacent the periphery of the anti-lock ring 170 so that it senses the teeth as the gear is rotated. It will be seen in FIG. 12 that the hall effect sensor 175 is shown as being schematically connected to an oscilloscope 173. The regular trace 174 on the oscilloscope indicates the regular passage of teeth as the CV joint rotates in the test stand. However, if teeth are missing, or if the gear is bent or otherwise distorted, the regular pattern shown at 166 will not be present, and that will be an indication that the anti-lock ring is defective.

Since the form of the anti-lock ring can vary within a reasonably wide range from vehicle to vehicle, an adjustable mount 166 is provided for associating the sensor 175 with the ring. The adjustable mount includes a base 177 attached as by bolts to an upstanding bracket 95. Projecting from the base 177 is a rod 178 having a sliding block 179 mounted thereon. The sliding block has the sensor 175 mounted on one side and an adjustment nut 180 on the other side. The adjustment nut 180 is loosened and the sensor 175 positioned adjacent the gear, whereupon the adjustment nut 180 is tightened. The spacing between the end of the sensor 175 and the gear is adjusted for a very small clearance so that the hall effect sensor 175 is capable of producing a measurable signal when the CV joint is rotated and the gear teeth translate past the sensor 175.

Figure 12:
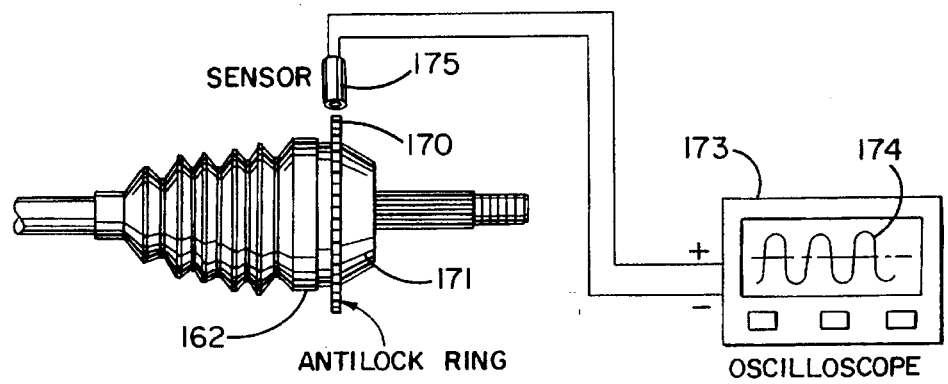
FIG. 12 is a diagram showing a test setup for checking the integrity of an anti-lock brake ring often found on the hub of CV joints.

The arrangement illustrated in FIGS. 7 and 12 is somewhat schematic, but is fully illustrative of the function of testing the integrity of the anti-lock ring by the same apparatus which tests the CV joint itself.

It should now be appreciated that what has been provided is a simple-to-use test stand for testing CV driveaxles. To simulate the operational conditions of an axle on a vehicle, the axle under test on the test stand is rotated under load while the outboard CV joint is flexed. The brake assembly is pivoted to flex the CV joint. In order to allow quick adaption of the test stand for testing different axles, an axle under test is connected to the drive and brake spindles with adaptors, which can be quickly connected to and released from the spindles. In the preferred embodiment, the drive assembly can be manually translated for easy connection of the axle to the drive spindle. The test stand also gives the operator full control of the testing process by providing manual control for engaging the brake and pivoting the brake assembly. As an auxiliary feature, an accelerometer is placed on the bearing block of the brake spindle for accurate vibration detection. To present the measured vibration signal in a way that is easy to understand and useful, an electrical circuit processes the signal and provides visual signals to the operator indicating whether the vibration generated by the CV joint exceeds a preset reference level.

What is claimed is:

1. A test unit for testing driveaxles which include two constant velocity universal (CV) joints, the test unit being adapted to identify driveaxles which exhibit undesirable vibration under load, the test unit comprising in combination:

a base supporting a drive assembly and a brake assembly, a motor connected to a drive spindle in the drive assembly, a brake connected to a brake spindle in the brake assembly, a plurality of spindle adaptors for the drive spindle and the brake spindle, having splined sockets for receiving splined shafts of drive axles of a plurality of configurations, the drive and brake spindles having quick-change fixtures including a quick release detent and a slidable keyway for quick interchange of adaptors, the keyway being of adequate dimension to reliably transmit a predefined torque through a drive axle under test, translation means for controllably translating one of said assemblies with respect to the other to facilitate the engagement of the splines of a driveaxle with splined sockets in the spindle adaptors to mount a drive axle into the test stand for testing, pivoting control means for controllably pivoting the brake spindle with respect to the drive spindle to controllably flex at least one of the CV joints in the driveaxle during a driveaxle test, and a control system for energizing the motor to rotate the driveaxle, then controllably engaging the brake to load the driveaxle and engaging the pivoting control means for flexing at least one of the CV joints to detect the presence of any vibrations in the CV joint being flexed at particular angles of flex.

2. A test unit as defined in claim 1, wherein the drive assembly is slidably mounted on ways on the base, the translation means including an operator-controllable translation mechanism for smoothly translating the drive assembly along the ways for engaging the drive axle under test with the drive spindle.

3. A test unit as defined in claim 2, wherein the translation mechanism includes a lock for locking the drive assembly in position after the axle under test is mounted on the test unit.

4. A test unit as defined in claim 1, wherein the brake is a hydraulic brake adapted to generate a preset torque for loading the axle under test.

5. A test unit as defined in claim 4, wherein the preset torque is in the range between about 150 and 250 ft.-lb.

6. A test unit as defined claim 1, wherein the control system includes manual control for engaging the brake for loading the axle under test.

7. A test unit as defined in claim 1, wherein the brake spindle is supported by a bearing block, and an accelerometer is mounted on the bearing block for detecting the vibrations generated in the driveaxle under test.

8. A test unit as defined in claim 1, wherein the pivoting control means has a range of about 40 degrees of pivoting to flex the CV joint being flexed through a range of about 40 degrees.

9. A test unit as defined in claim 8, wherein the pivoting control means has mechanical stops for limiting the range of pivoting.

10. A test unit as defined in claim 1, wherein the control system includes a manually operated pivoting control for having left, stop and right positions for providing full operator control of the flex angle of the CV joint being flexed.

11. A test unit as defined in claim 1, wherein the constant velocity universal joint also includes an anti-lock ring having a plurality of teeth on the periphery thereof, and the test unit further includes a sensor, means for positioning the sensor opposite the teeth, and circuit means connected to the sensor for determining the regularity of teeth on the anti-lock ring as the CV joint being flexed is rotated.

12. A test unit as defined in claim 1, further including an accelerometer mounted to sense vibration generated by the CV joint being flexed during rotation thereof, and electrical circuitry coupled to the accelerometer for producing a signal having a magnitude related to the amplitude of the vibration.

13. A method for testing drive axles which include two constant velocity universal (CV) joints and first and second shafts to identify drive axles which exhibit vibration under load, the method comprising the steps of:

selecting spindle adaptors compatible with the shafts of the axle under test, operating a releasable detent mechanism to install a first one of the selected adaptors on a keyed brake spindle connected to a brake, operating another releasable detent mechanism to install a second one of the selected adaptors on a keyed drive spindle connected to a motor, inserting an outboard shaft of the axle under test into the first adaptor on the brake spindle, translating the drive spindle toward the brake spindle while holding the outboard shaft of the axle in position to insert the outboard shaft into the second adaptor then braking the drive spindle against further translation, energizing the motor to rotate the axle, engaging the brake to load the axle, controllably pivoting the brake spindle to flex the outboard universal joint on the axle, and detecting vibration generated in the axle.

14. A method as defined in claim 13, wherein the step of translating translates the drive spindle manually for smooth advancement of the drive spindle.

15. A method as defined in claim 13, where the brake is engaged by operating a normally off valve to provide for temporary engagement of the brake.

16. A method as defined in claim 15, wherein the step of engaging the brake loads the axle with a preset torque.

17. A method as defined in claim 16, wherein the step of engaging the brake includes manually actuating the brake to apply a preset torque on the axle for loading.

18. A method as defined in claim 13, wherein the step of detecting vibration includes receiving an electrical signal from an accelerometer mounted to sense axle vibration for quantifying the magnitude of the vibration generated in the axle.

19. A method as defined in claim 13, wherein the step of pivoting pivots the brake spindle by at least 40 degrees.

20. A method as defined in claim 13, wherein at least one of the constant velocity universal joints includes an anti-lock ring having a plurality of teeth spaced about the periphery thereof, and the method further includes the step of sensing the teeth as the axle is rotated to check the integrity of the anti-lock ring.

* * * * *